United States Patent [19]
Okada et al.

[11] Patent Number: 5,415,957
[45] Date of Patent: May 16, 1995

[54] CATHODE MATERIAL AND SECONDARY BATTERY USING THE SAME

[75] Inventors: Shigeto Okada; Hideaki Ohtsuka; Hajime Arai; Masasi Shibata, all of Mito; Masahiro Ichimura, Kawasaki, all of Japan

[73] Assignee: Nippon Telegraph and Telephone Corporation, Tokyo, Japan

[21] Appl. No.: 130,194

[22] Filed: Oct. 1, 1993

[30] Foreign Application Priority Data

Oct. 6, 1992 [JP] Japan .................... 4-292195

[51] Int. Cl.$^6$ ............... H01M 6/14; H01M 4/52
[52] U.S. Cl. ................... 429/194; 429/197; 429/221; 423/558
[58] Field of Search ........... 429/194, 197, 221, 205; 423/558

[56] References Cited

U.S. PATENT DOCUMENTS

| | | | |
|---|---|---|---|
| Re. 11,238 | 4/1892 | Roberts ...................... | 429/221 |
| 2,301,103 | 11/1942 | Wilson et al. ............... | 423/558 |
| 3,361,596 | 1/1968 | Senderoff et al. .......... | 429/112 |

FOREIGN PATENT DOCUMENTS 173121  3/1986  European Pat. Off. ......... 429/221
1277397 9/1968 Germany .

OTHER PUBLICATIONS

Aselage, T. L., "Multicomponent phase diagrams for battery applications . . . ," J. Electrochem. Soc., 134(8A), Aug. 1987, pp. 1932–1938.
Database WPI, Week 7930, Derwent Pubications Ltd., London, GB: AN 79-55439B and JP-A-54 075 532 (Hitachi K. K.), Jun. 16, 1979.

Primary Examiner—Steven Bos
Attorney, Agent, or Firm—Finnegan, Henderson, Farabow, Garrett & Dunner

[57] ABSTRACT

A cathode material made of anhydrous ferric sulfate with a hexagonal crystal structure is presented for use in a secondary battery which generates a stable open-circuit-voltage of about 3.6 volts and offers a recharge cycling capacity of over 100 times. The cathode material is obtained by heating hydrous iron sulfate material in a temperature range between 250° and 600° C. to remove the water of crystallization. The secondary battery made with this cathode material provides a long-service life and a stable output voltage economically, because the starting material, iron sulfate, is abundantly available at relatively low cost.

11 Claims, 8 Drawing Sheets

HEXAGONAL Fe$_2$(SO$_4$)$_3$

FIG.1

HEXAGONAL $Fe_2(SO_4)_3$

FIG.2

MONOCLINIC $Fe_2(SO_4)_3$

CATHODE MATERIAL AND SECONDARY BATTERY USING THE SAME

BACKGROUND OF THE INVENTION

1. Field of the Invention

The present invention relates to a cathode material for use as a positive electrode in a secondary battery (that is to say, rechargeable battery), and relates in particular to a cathode material made with anhydrous ferric sulfate

2. Technical Background

Secondary batteries having a non-aqueous electrolyte solution, represented typically by lithium battery, comprises a negative electrode made of an anodic material of alkaline metal such as lithium, a positive electrode made of a cathodic material such as transition metal oxides and a non-aqueous electrolyte solution containing a salt of the alkaline metal of the cathode material. In secondary batteries of such a configuration, recharging is made possible by insertion or intercalation of the alkaline metal ions in the lattice structure of the cathode material. Therefore, the choice of a cathode material depends critically on its ability to act as a host to such Li insertion or Li intercalation.

The cathodic materials are conventionally transition metal oxides. On the other hand, in secondary batteries having vanadium pentaoxide or manganese dioxide as the cathode material, and lithium as the anode material, the open-circuit voltage is low and the charge/discharge current density is insufficient.

In recent years, there have been reports of reversible insertion of Li-ions at above 3.5 volts into such materials as: $LiCoO_2$ with a layered rock-salt type structure (K. Mizushima, P. C. Jones, P. J. Wiseman and J. B. Goodenough, Mat. Res. Bull., vol. 15, 783(1980)); $LiNiO_2$ (M. G. S. R. Thomas, W. I. F. David and J. B. Goodenough, Mat. Res. Bull., vol. 20, 1137(1985)); and $LiMn_2O_4$ (T. Ohzuku, M. Kitagawa and T. Hirai, J. Electrochem. Soc., vol. 137, 769(1990)) of a spinel type structure. In 1991, lithium secondary batteries using $LiCoO_2$ as the cathode material became commercially available (T. Nagaura and K. Tozawa, Prog. Batt. Solar Cells, vol. 9, 209(1990)). However, such batteries are expensive because they use expensive metals such as Co, Ni and Mn. This problem becomes even more acute for mass production applications.

Therefore, there have been various attempts at using low-cost iron compounds as the cathode material. For example, the following substances have been studied: $FePS_3$ (A. Le Mehaute, G, Ouvrard, R. Brec and J. Rouxel, Mat. Res. Bull. vol. 12, 1191(1977); FeOCl (M. S. Whittingham, Prog. Solid State Chem., vol. 12, 41(1978); $FeS_2$ (R. Brec and A. Dugast, Mat. Res. Bull., vol. 15, 619(1980); however, all of these materials suffer from low discharge voltage, and insufficient cyclability. On the other hand, Goodenough et al. published a study which compared the charge/discharge properties of monoclinic ferric sulfate, $Fe_2(SO_4)_3$, made by refluxing ferrous sulfate of a composition given by $Fe_2SO_4.7H_2O$, and of rhombohedral ferric sulfate, made by heating ferric sulfate of a composition given by $Fe_2(SO_4)_3.nH_2O$, at 200° C. (A. Manthiram and J. B. Goodenough, J. Power Sources, vol. 26, 403(1989)). Test cells made from the two polymorphs of $Fe_2(SO_4)_3$ showed that, initially, they showed the same open-circuit voltage (OCV) of about 3.6 volts. However, the OCV for rhombohedral form of $Fe_2(SO_4)_3$ exhibited a monotonically decreasing dependence on the molar Li content while the OCV for monoclinic form of $Fe_2(SO_4)_3$ was independent of molar Li content up to about two moles. From their results, it was not clear whether or not discharging reactions in the test cells made from these materials are reversible. Furthermore, rhombohedral ferric sulfate is not a widely known material. The Joint Committee on Powder Diffraction Standards (JCPDS) reports the data on only two crystal structures for ferric sulfates: hexagonal and monoclinic. Therefore, the crystallography of the rhombohedral ferric sulfate reported in the study is uncertain.

The present inventors have made a detailed study of the crystallographic structure of ferric sulfate and of the effects of the water of crystallization on the charge/discharge properties (hereinafter referred to as cycling properties) of this material for use as a cathode material in secondary batteries.

SUMMARY OF THE INVENTION

The objective of the present invention is to present a cathode material, exhibiting excellent charge and discharge characteristics, which can be produced at low cost, and a secondary battery having a positive electrode made with the cathode material.

The cathode material of the present invention features an anhydrous ferric sulfate having a hexagonal crystal symmetry. The preferable cathode material is made by thoroughly dehydrating iron sulfate salt by heat treating in a temperature range between 250° and 600° C.

The anhydrous ferric sulfate of the present invention used as the cathode material has a good crystal symmetry, therefore, the energy of a redox reaction between Fe (III) and Fe (II) resulting from, for example, the insertion of Li ions into the lattice of the cathode material, is relatively high. Consequently, the generated voltage of the secondary battery using the anhydrous ferric sulfate as the cathode material is also high. Further, the positive electrode made of the anhydrous ferric sulfate is depleted of the water of crystallization by heat treatment, therefore the degradation of the anode material, caused by the reaction with the residual water within the cathode material is prevented. Moreover, the material and production costs of the secondary battery can be reduced significantly because the starting material, iron sulfate, is a relatively abundant and inexpensive. It follows that the secondary battery using the cathode material of the present invention offers a high generated voltage, excellent cyclability and long service life at low cost.

PREFERRED EMBODIMENTS OF THE INVENTION

First, some theoretical explanation will be presented to describe why anhydrous iron sulfate of a hexagonal symmetry is more suitable than other crystal symmetries as a cathode material of the present invention.

It has been found that the cathode material of the present invention is characterized by anhydrous ferric sulfate having a hexagonal crystal symmetry.

Figure 1:
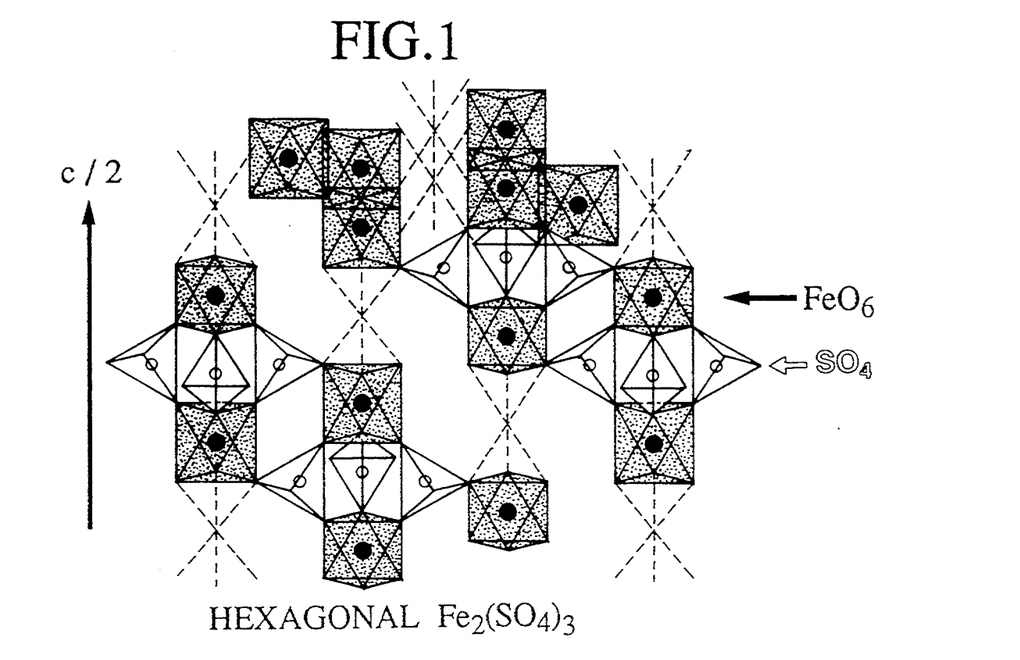
FIG. 1 is a schematic presentation of the hexagonal form of ferric sulfate.

As shown in FIG. 1, a hexagonal crystal unit of ferric sulfate, $Fe_2(SO_4)_3$, consists of two octahedral $FeO_6$ groups having an Fe (III) atom at their center and oxygen atoms at their corners; and three tetrahedral $SO_4$ groups having one sulfur atom at its center and oxygen atoms at its corners. An oxygen atom is shared between one octahedral group and one tetrahedral group. It is a symmetric crystalline material.

Figure 2:
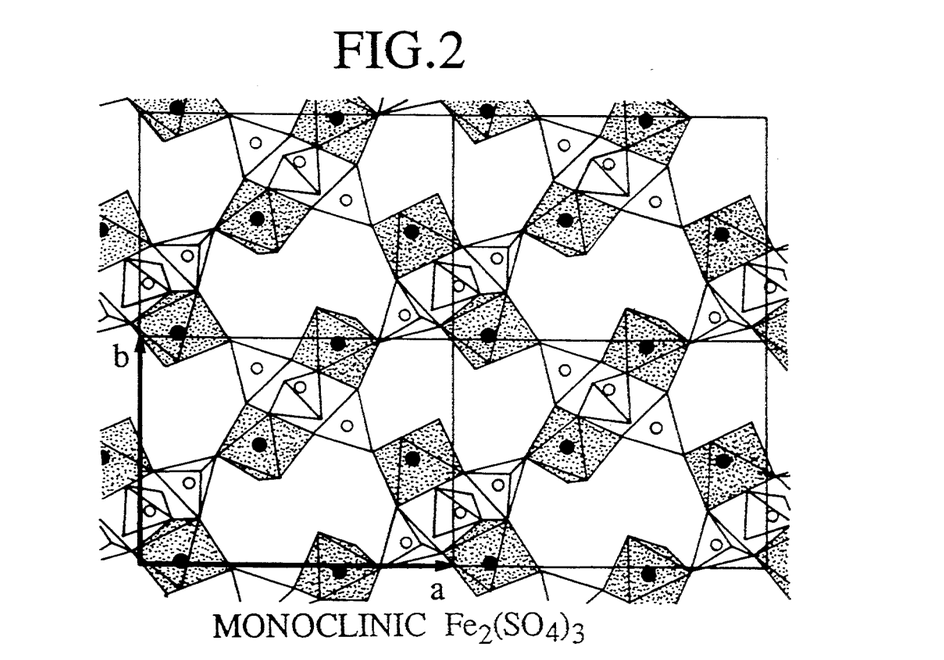
FIG. 2 is a schematic presentation of the monoclinic form of ferric sulfate.

It is known that ferric sulfate can also assume a monoclinic crystal symmetry. A monoclinic $Fe_2(SO_4)_3$ crystal structure, as shown in FIG. 2, consists of crystal units whose slanted crystal axes cross each other, and is somewhat distorted and asymmetrical.

Let us consider the electron distribution of an Fe (III) atom in a free ionic state. In this condition, the five 3d-electrons of a ferric ion Fe (III) occupies each of the five 3d-orbitals within the same energy level. We next consider the energy distribution of the same Fe (III) atom existing in a crystalline form. The energy levels of the 3d-orbitals within the Fe (III) atom are split into three degenerate dε-energy levels and two degenerate dγ-energy levels with one electron in each degenerate energy level.

The energy levels are affected by the crystal field strength which depends on the crystal symmetry, and it appears that the better the crystal symmetry, the higher the energy difference between the dε- and dγ-energy levels, and the larger the redox energy difference between Fe (III) and Fe (II) valency states become. In a secondary battery, the difference in the redox energies between the Fe (III) and Fe (II) valency states is reflected on the magnitude of the voltage generated in the battery having its cathode made of the crystalline Fe (III). Therefore, from the crystallographic as well as valency considerations, it seems that the hexagonal ferric sulfate is superior to monoclinic ferric sulfate as a candidate material for the cathode.

The present inventors reviewed the properties of the two polymorphs of the ferric sulfate material, and focused their attention on the symmetrical hexagonal ferric sulfate. They discovered that a secondary battery using this material exhibited outstanding cycling capabilities.

The cathode material of the present invention, anhydrous ferric sulfate, should preferably be obtained by treating of iron sulfate salts in a temperature range between 250° and 600° C. so as to thoroughly remove the water of crystallization. In the specification, iron sulfate salts refer to iron salts containing iron sulfate such as ammonium ferrous sulfates hexahydrate, $(NH_4)_2Fe(SO_4)_2 \cdot 6H_2O$, or ammonium ferric sulfate dodecahydrate, $(NH_4)Fe(SO_4)_2 \cdot 12H_2O$, as well as hydrated ferric sulfate $Fe_2(SO_4)_3 \cdot nH_2O$. It is preferable that an iron sulfate salt (to be made into cathode material) should have a well defined number of moles of water of crystallization. For example, as noted above, ammonium iron sulfate includes salts with six moles and twelve moles of water of crystallization, and both materials can be obtained commercially. For example, when the starting material contains six moles of water, as in ammonium ferrous sulfate, the water can be removed completely by heating it for twelve hours at temperatures between 430° and 600° C., thus providing anhydrous ferric sulfate. X-ray diffraction tests confirmed that the crystal structure of this heat treated material has a hexagonal crystal symmetry. The dehydration reaction is considered to be as follows:

$$2(NH_4)_2Fe(SO_4)_2 \cdot 6H_2O$$

$$\rightarrow Fe_2(SO_4)_3 + 14H_2O\uparrow + 4NH_3\uparrow + SO_2\uparrow \qquad \text{Eqn (1)}$$

Further, it was confirmed that when the starting material is ammonium ferric sulfate of a composition given by $(NH_4)Fe(SO_4)_2 \cdot 12H_2O$, it is possible to remove the water of crystallization completely by heat treating it at temperatures between 430° and 600° C.

On the other hand, other ferric sulfate crystals are known to contain 1, 7.5, 8, 9, or 10 moles of water of crystallization. Commercially available materials are typically a mixture of all such hydrated materials, and it is not possible to define a specific number of moles of water contained in a given lot, giving rise to the general designation, $(NH_4)_2Fe(SO_4)_2 \cdot nH_2O$. It was discovered in the present invention that it is possible to completely convert this material to anhydrous ferric sulfate. This means that even when the exact water content is unknown, it is possible to produce anhydrous ferric sulfate by appropriate heat treatment.

On the other hand, no matter what type of iron sulfate salt is used as the starting material, if it is heated at temperatures beyond 600° C., the iron sulfate component decomposes. It is for this reason that the upper limit for the heat treatment temperature was defined at 600° C.

Next, the configuration of a secondary battery having a positive electrode of the cathode material of the present invention will be described.

Figure 3:
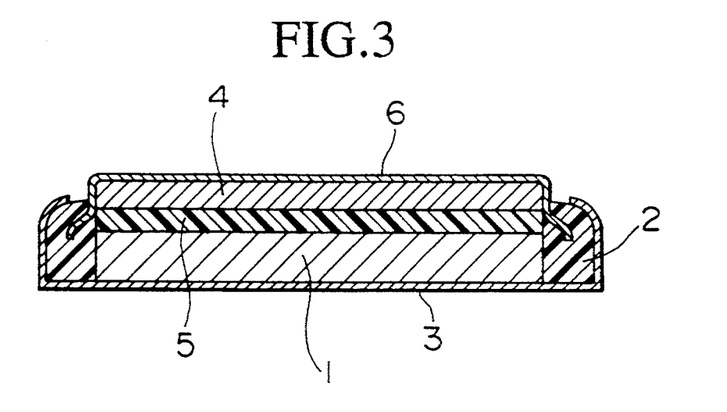
FIG. 3 is a cross sectional view of an embodiment of the secondary battery of the present invention.

FIG. 3 shows an embodiment of the secondary battery according to the present invention. The reference numeral 1 refers to a disc-shaped positive electrode. The positive electrode 1 is press fitted into a bowl-shaped positive electrode case (shortened to positive case) 3, thus electrically connecting the positive electrode 1 and the positive case 3 which is made of stainless steel. A disc-shaped negative electrode 4 made of lithium metal is disposed opposite to the positive electrode 1 with a separator 5 interposed between the positive electrode 1 and the negative electrode 4. The negative electrode 4 is press fitted to a negative electrode case (shortened to negative case) 6 made of stainless steel which has about the same inner diameter as the outer diameter of the negative electrode 4. The negative electrode 4 and the negative case 6 are electrically connected. The peripheral edge portion of the negative case 6 is embedded in the gasket material 2 disposed in the space between the positive electrode 1 and the positive case 3. The gasket material 2 hermetically seals the inner layered section of the secondary battery comprising a positive electrode 3, a separator 5 and the negative electrode 4. The separator 5 is made of a porous material which is infiltrated with an electrolyte solution consisting of a non-aqueous solvent and a lithium salt such as $LiAsF_6$ dissolved therein. The electrolyte solution is in contact with the positive electrode 1 as well as the negative electrode 4, thus communicating the positive electrode 1 ionically with the negative electrode 4.

The positive electrode of the secondary battery is preferably made by mixing a powder of the ferric sulfate of the present invention with a binder powder, such as polytetrafluoroethylene (PTFE), and making a compact by pressing the powder mixture. It is also permissible to add an electrically conductive powder, such as carbon black or acetylene black, to the powder mixture so as to improve the electrical conductivity of the positive electrode.

The negative electrode is preferably a disc-shaped material punched from a strip of lithium metal, or made from a lithium alloy such as lithium aluminum alloy and Wood's metal, or by forming lithium compounds such as lithium carbonate and lithium nitrate to a specific size. However, the possible negative electrode materials are not limited to lithium related substances. Other possible substances include sodium, potassium metals and alloys, and their compounds.

The non-aqueous electrolyte solution consists essentially of a solvent and an electrolyte salt. Possible solvent media include polar organic solvents such as ethylene carbonate, 2-ethyltetrahydrofuran diethoxysilane, 2-methyltetrahydrofuran, methyl formate, dimethyl sulfoxide, propylene carbonate, acetonytrile, γ-butylolactone, dimethylformamide, 1,2-dimethoxyethane, diethyl carbonate, dimethyl carbonate, methylethyl carbonate, tetrahydrofuran, 1,3-dioxolan, 4-methyl-1,3-dioxolan, singly or as a mixture. Potential solvents are not limited to such substances, the requirement being that the solvent be chemically stable with respect to the cathode and anode materials. Also, these solvents should preferably be dehydrated by such means as distillation and other methods.

The electrolyte salt includes an alkaline metal salt contained in the anode material. For example, if lithium is used as the anode material, it is preferable to use lithium-containing salts such as $LiAsF_6$, $LiBF_4$, $LiPF_6$, $LiAlCl_4$, $LiClO_4$, $LiC(CF_3SO_2)_3$, $LiC(CF_3SO_2)_2$, $LiCF_3SO_3$. $LiC_nF_{2n+1}SO_3$ (where n in an integer greater than 1), $LiC_nF_{2n-1}SO_3$ (where n in an integer greater than 1), $LiCl$, $LiSCN$, $LiSbF_6$, $LiCF_3CO_2$, $Li_2B_{10}Cl_{10}$, lithium tetraphenylborate, and lithium tetrakis-(3,5-bis-(trifluoromethyl)phenyl) borate.

The separator can either be the above-mentioned type of electrically insulating porous substance or a polymeric substance capable of being infiltrated with an electrolyte solution.

Almost any material can be used for the positive or negative case, so long as it is electrically conductive, for example, stainless steel.

In the secondary battery described above, a voltage of 3.6 volts is generated between the positive and negative electrodes. Therefore, if the positive and negative cases are connected electrically with an intervening electrical load, e.g. resistance, the discharge current flows in accordance with the magnitude of the electrical load. After the battery is discharged, when a voltage of 3.8 volts is applied to the positive electrode with respect to the negative electrode, lithium ions are deintercalated from the ferric sulfate cathode material, thereby recharging the secondary battery. Recharging establishes a voltage of about 3.6 volts between the positive and negative electrodes. According to an embodiment of the present invention, in which a constant-current discharge experiment was conducted at a discharge current density of 0.5 $mA/cm^2$, the battery was able to maintain the initial voltage of 3.6 volts over a period of ten hours. By recharging the battery when the voltage dropped to 3 volts to regenerate 3.6 volts, it was found that even after 100 cycles, the battery still retained a high reversible cycling capacity of about 100 mAh/g where g represents the net weight of the battery excluding the cases.

As described above, the cathode material of the present invention has a good hexagonal crystal symmetry, and comprises anhydrous ferric sulfate which does not contain any residual water of crystallization. Therefore, the secondary battery, comprising a cathode material for the positive electrode, an alkaline metal material for the negative electrode and a non-aqueous electrolyte solution containing the alkaline metal ions, generates a high and stable output voltage over a wide Li content range in the cathode material. Further, because iron sulfate is a low cost material, the production cost for the secondary battery can be reduced significantly. Therefore, the secondary battery of the present invention offers attractive advantages of a high output voltage, excellent cycling capability and long service life, coupled with economic advantage of low production cost.

In addition, Goodenough et al. reported, as mentioned earlier, that in lithium batteries having a cathode material made of ferric sulfate, monoclinic ferric sulfate provides better discharge properties than rhombohedral ferric sulfate, even though the monoclinic crystal symmetry is inferior to the rhombohedral crystal symmetry which is similar to the hexagonal crystal symmetry. Therefore, on the basis of the crystal symmetry, the present invention is not obvious to those skilled in the art. The performance characteristics of the secondary batteries made with the cathode material of the present invention are unexpected in terms of the conventional technology.

EXAMPLES

In the following, experimental examples of various embodiments are presented to demonstrate the various aspects of the present invention. However, these examples are not restrictive but illustrative of the basic principles of the present invention.

The processes of making the batteries and measuring their cycling properties were carried out in dry boxes containing an argon atmosphere.

Embodiment 1

Commercially available ammonium ferrous sulfate of a composition given by $(NH_4)_2Fe(SO_4)_2.6H_2O$ was subjected to differential thermal analysis (DTA) and thermogravimetry (TG) in a range of temperatures from 50° to 700° C.

Figure 4:
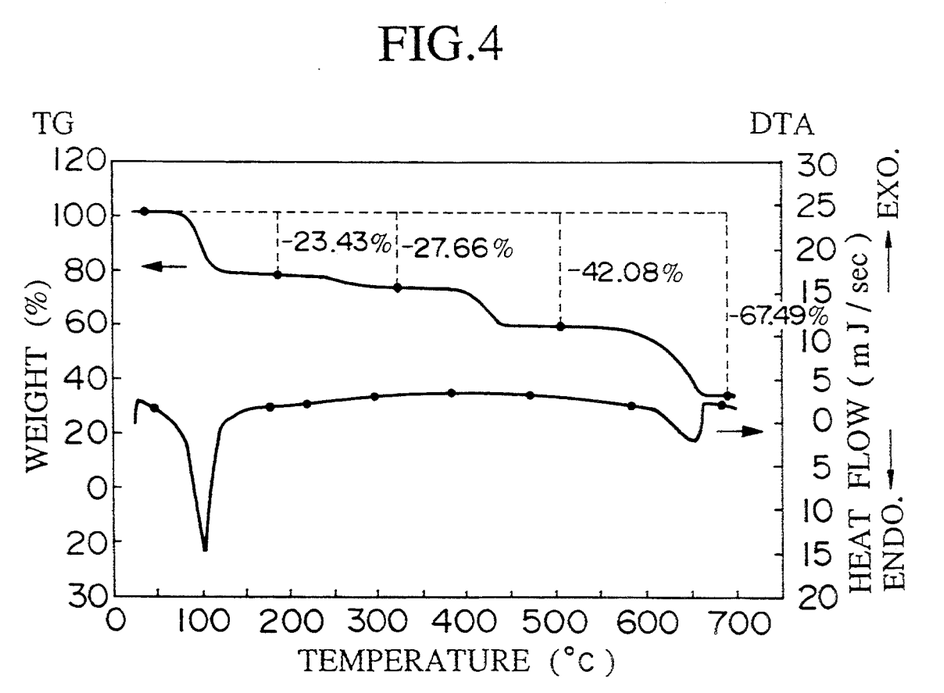
FIG. 4 shows the results of thermogravimetry (TG) and differential thermal analysis (DTA) of ammonium ferrous sulfate hexahydrate, $(NH_4)_2Fe(SO_4)_2.6H_2O$.

The results are shown in FIG. 4. The TG curve (top curve, left scale) shows weight loss stages which are thought to be caused by loss of water of crystallization between 50° to 430° C. while the curve becomes relatively flat from 430° to 600° C. The weight loss is about 42% of the initial weight, and corresponds to the theoretical dehydrated weight of $(NH_4)_2Fe(SO_4)_2.6H_2O$ based on the dehydration reaction presented in Equation (1) which produces anhydrous ferric sulfate. When the temperature exceeds 600° C., further weight loss is observed in the TG curve, and the DTA curve also shows an endothermic reaction. It is considered that this reaction corresponds to the decomposition of anhydrous ferric sulfate. These results demonstrate that it is possible to completely dehydrate $(NH_4)_2Fe(SO_4)_2.6H_2O$ and thus produce anhydrous ferric sulfate, by heat treating it in a temperature range of 430° to 600° C.

Embodiment 2

Ammonium ferrous sulfate of a composition given by $(NH_4)_2Fe(SO_4)_2.6H_2O$ was heated for 24 hours at 500° C., and the resulting anhydrous ferric sulfate powder was analyzed by X-ray diffraction. The diffraction results are shown in FIG. 5(a) together with the diffraction chart for hexagonal ferric sulfate according to JCPDS in FIG. 5(b).

Figure 5:
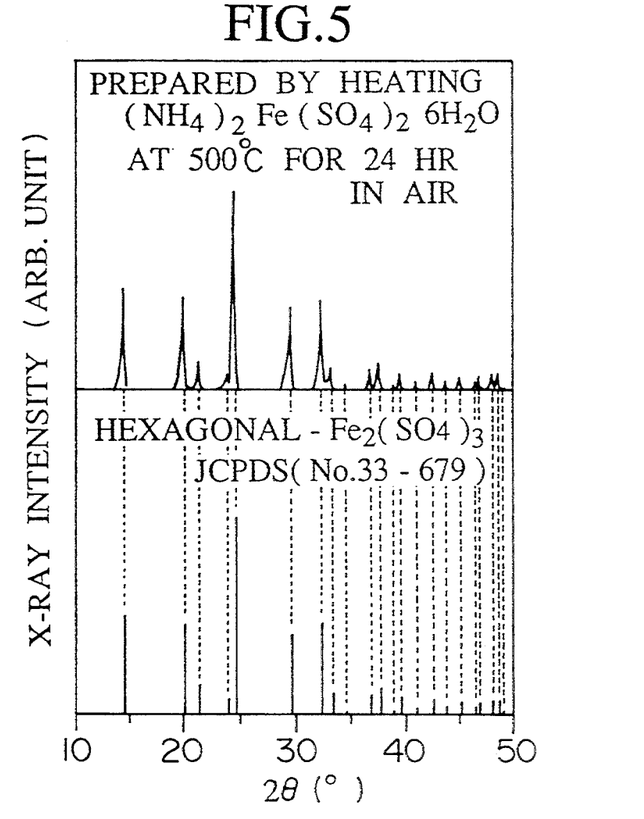
FIG. 5 shows the results of X-ray diffraction analysis of hexagonal anhydrous ferric sulfate used as the cathode material in the present invention.

The peaks in the diffraction data in FIG. 5(a) are observed to correspond exactly to those in the standard diffraction chart for hexagonal anhydrous ferric sulfate of a composition given by $Fe_2(SO_4)_3$, shown in FIG. 5(b).

It was concluded therefore that the heat treated powder was hexagonal anhydrous ferric sulfate.

Embodiment 3

In this embodiment, test batteries of the configuration shown in FIG. 3 were produced using the powder material of anhydrous ferric sulfate produced by following the procedure described in embodiment 2.

The anhydrous ferric sulfate powder was mixed with powders of acetylene black and polytetrafluoroethylene at a respective ratio of 70:25:5. The blended mixture was press formed into pellet-shaped positive electrodes of 17 mm diameter and 0.5 mm thickness, each weighing about 140 mg.

The negative electrode was made by punching out disc-shaped electrodes of 17 mm diameter from a lithium metal strip.

The electrolyte solution was produced by using equal amounts of propylene carbonate and 2-dimethoxyethane as a solvent, and dissolving $LiClO_4$ in it at 1N.

The battery assembly procedure was as follows. A negative electrode was pressed into a rubber gasket fitted into a negative case made of stainless steel, and overlayed with a separator and a positive electrode. After injecting electrolyte solution into the separator, a positive case was placed over the positive electrode and pressed to complete the assembly of the secondary battery of this embodiment.

Embodiment 4

Figure 6:
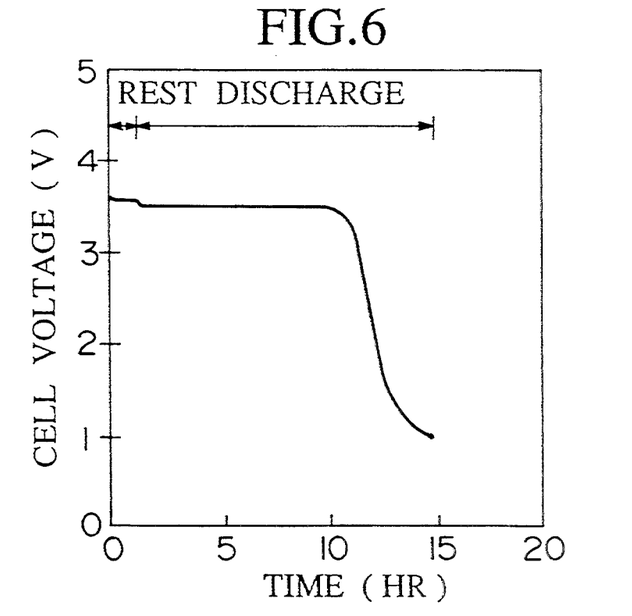
FIG. 6 shows the discharging characteristics of a secondary battery using the cathode material of the present invention.

The discharge characteristics of the secondary battery made in embodiment 3 were determined. After measuring the open circuit initial voltage of the battery for one hour, the battery was discharged at a constant current density of 0.5 mA/cm² while monitoring the voltage. The results are shown graphically in FIG. 6 with the vertical axis showing the voltage and the horizontal axis showing the elapsed time.

It can be seen that in the secondary battery of this embodiment, the voltage stabilized at around 3.6 volts immediately after commencing measurement, and maintained the same voltage for the ten-hour discharging period.

Embodiment 5

Figure 7:
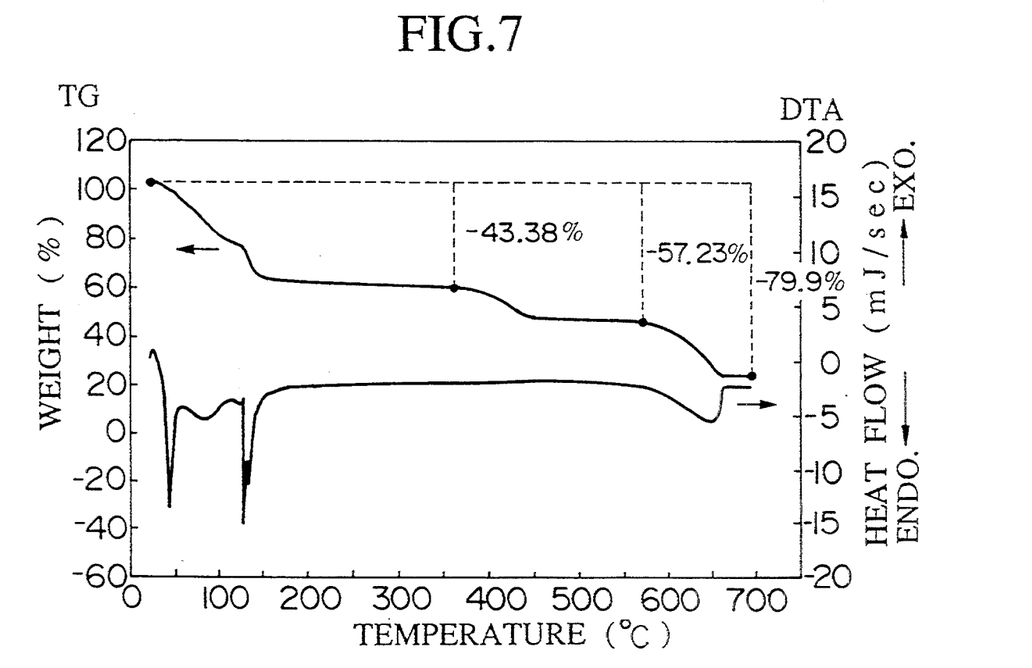
FIG. 7 shows the results of thermogravimetry and differential thermal analysis, of ammonium ferric sulfate dodecahydrate, $(NH_4)Fe(SO_4)_2 \cdot 12H_2O$.

Commercial lot of ammonium ferric sulfate of a composition give by $(NH_4)Fe(SO_4)_2.12H_2O$ was subjected to DTA and TG analyses over a temperature range from 50° to 700° C. The results shown in FIG. 7 are very similar to those for $(NH_4)_2Fe(SO_4)_2.6H_2O$. In this case also, the weight loss corresponded to the lost weight of the water of crystallization. Therefore, it can be seen that even in the case of ammonium ferric sulfate of a composition given by $(NH_4)Fe(SO_4)_2.12H_2O$, it is possible to completely eliminate the water of crystallization to produce anhydrous ferric sulfate by heating it between 430° and 600° C.

Next, test battery samples were prepared in the same way as reported in embodiment 3, except for the starting material which was ammonium ferric sulfate of a composition give by $(NH_4)Fe(SO_4)_2.12H_2O$. The discharge characteristics of the test battery were measured as described in embodiment 4. The results were the same as those shown in FIG. 6.

Embodiment 6

Figure 8:
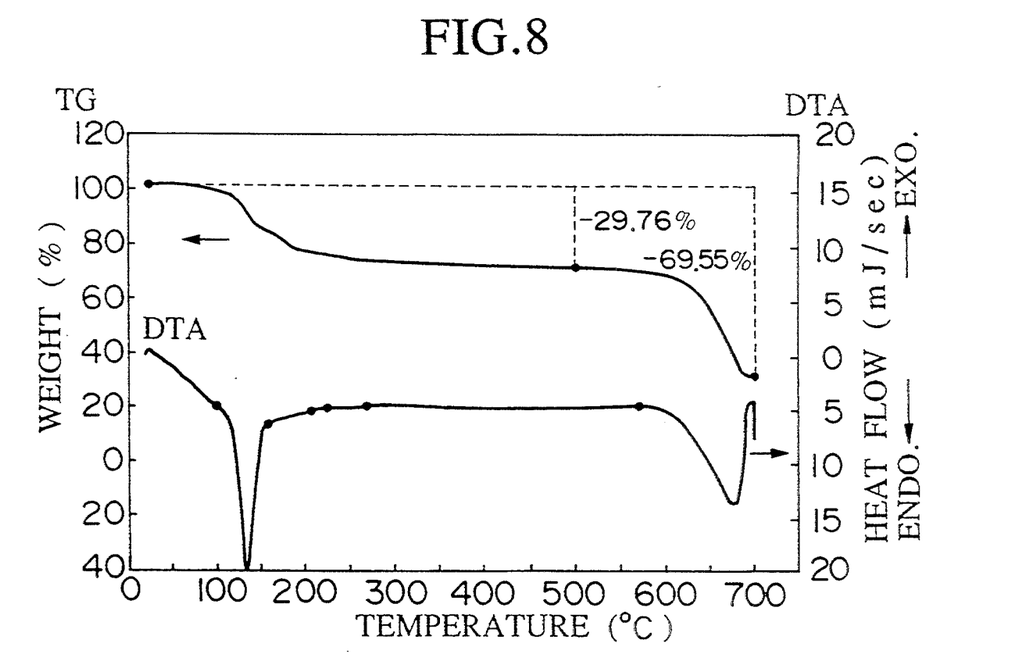
FIG. 8 shows the results of thermogravimetry and differential thermal analysis, of ferric sulfate of a composition given by $Fe(SO_4)_2 \cdot nH_2O$.

Commercial lot of ferric sulfate of a composition given by $Fe_2(SO_4)_3.nH_2O$ was subjected to DTA and TG analyses over a temperature range from 50° to 700° C. The results of both DTA and TG reported in FIG. 8 show that there is a large plateau region in a temperature range between 250° to 600° C. Therefore, it is evident that by using $Fe_2(SO_4)_3.nH_2O$ as the starting material, it is possible to completely eliminate the water of crystallization to produce anhydrous ferric sulfate by heating it between 250° and 600° C.

Next, test battery samples were prepared in the same way as reported in embodiment 3, except for the starting material which was $Fe_2(SO_4)_3.nH_2O$. The discharge characteristics of the test battery were measured as described in embodiment 4. The results were the same as those shown in FIG. 6.

Comparison Example 1

Figure 9:
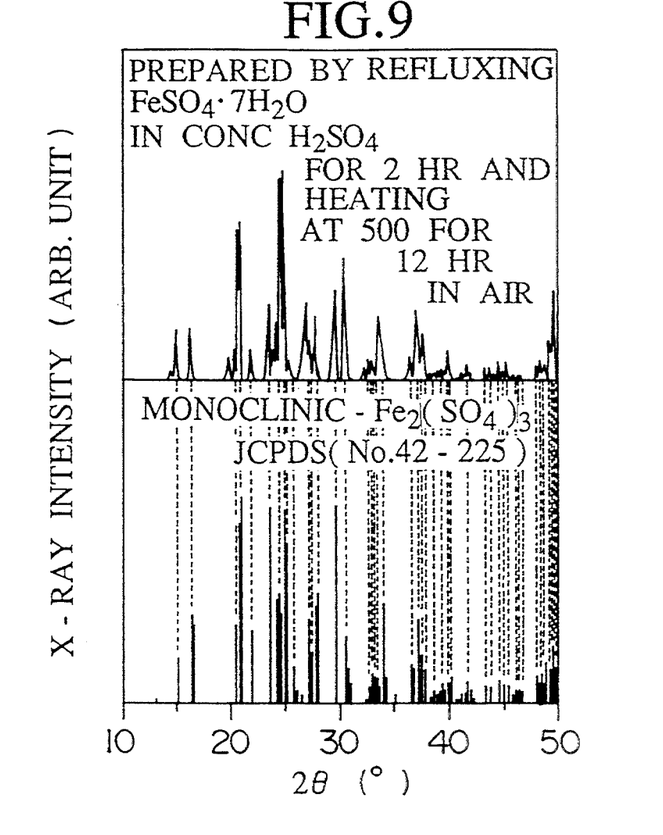
FIG. 9 shows the results of X-ray diffraction analysis of anhydrous monoclinic ferric sulfate.

Commercial ferrous sulfate having 7 moles of water of crystallization was refluxed in concentrated sulfuric acid for two hours. The resulting product was heated for twelve hours at 500° C. to produce anhydrous ferric sulfate, and was analyzed by X-ray diffraction. The results are shown in FIG. 9(a) for comparison with the standard chart of monoclinic anhydrous ferric sulfate issued by JCPD reproduced in FIG. 9(b). It can be concluded that the anhydrous ferric sulfate produced in this embodiment has the identical monoclinic crystal structure as the monoclinic $Fe_2(SO_4)_3$ reference material.

Next, test battery samples were produced in the same way as in embodiment 3, except that the cathode material was monoclinic ferric sulfate.

Figure 10:
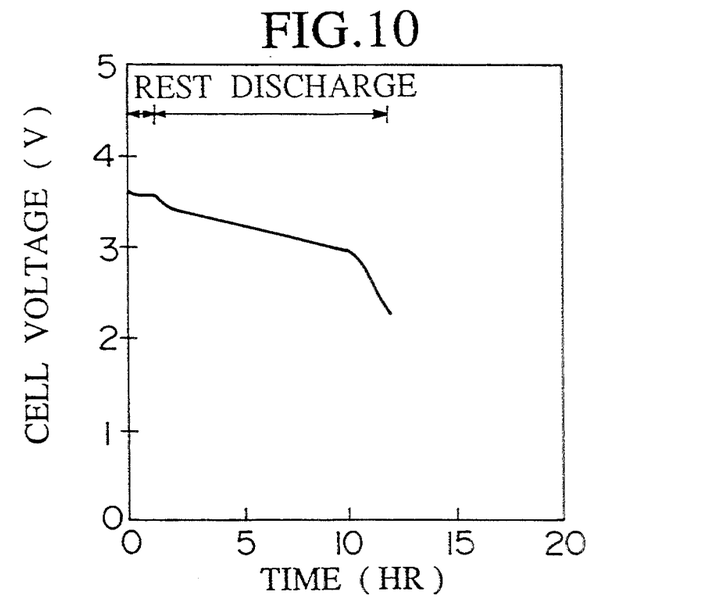
FIG. 10 is a graph showing the discharge characteristics of a test battery having anhydrous monoclinic anhydrous ferric sulfate as the cathode material.

The discharge characteristics of the battery samples were measured as described in embodiment 4. The results reported in FIG. 10 show that although the voltage remains at 3.6 volts for about two hours after commencing the discharge, as in the case of the hexagonal anhydrous ferric sulfate, the voltage gradually drops over time. This indicates that the comparison test battery is not capable of generating a stable high voltage.

Comparison Example 2

Commercial ferric sulfate of a composition given by $Fe_2(SO_4)_3.nH_2O$ having "n" moles of water of crystallization was subjected to twelve hours of heating at 90° C., and test battery samples were produced as described in embodiment 3.

Figure 11:
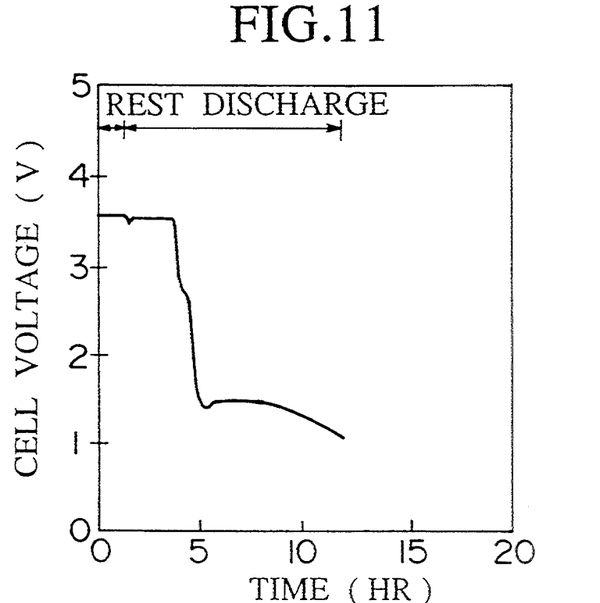
FIG. 11 is a graph showing the discharge characteristics of a comparative test battery having insufficiently dried hexagonal anhydrous ferric sulfate as the cathode material.

The discharge characteristics of the test batteries were measured as described in embodiment 4. The results shown in FIG. 11 indicate that although the initial voltage of 3.6 volts is maintained for about two hours after the discharge commences, the voltage then drops rapidly. This behavior is thought to be caused by the residual water of crystallization, which could not be eliminated by heating at 90° C., reacting with the lithium negative electrode and degrading the performance of the negative electrode.

Embodiment 7

Figure 12:
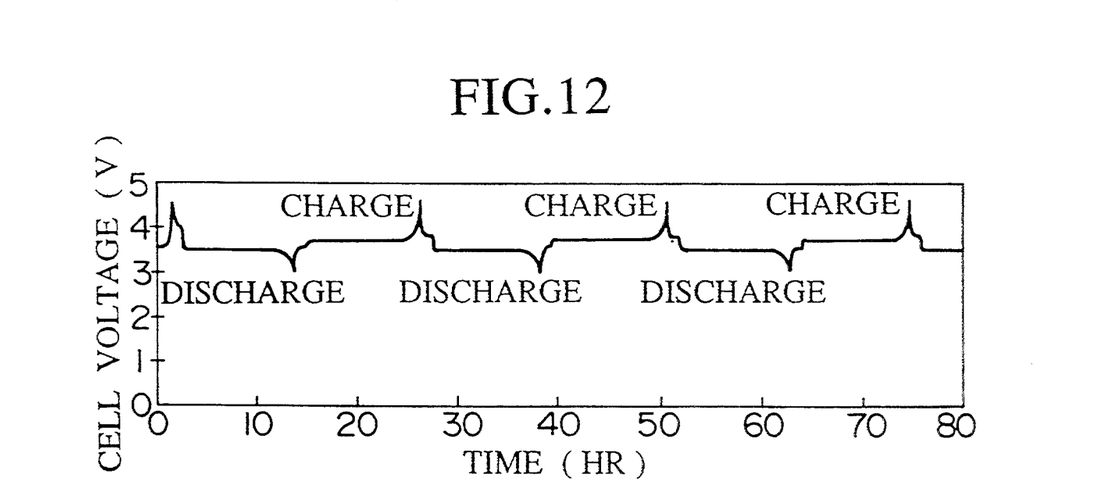
FIG. 12 is a graph showing cycling characteristics of a test battery having the cathode material of the present invention.

The test battery samples produced in embodiment 3 were subjected to repeated cycles of charge and discharge over a voltage range of 4.5 and 3.0 volts. The process involved the following steps: charging was continued until the open circuit voltage reached 4.5 volts; after resting the battery for one hour, it was discharged at a current density of 0.5 mA/cm² until the voltage dropped to 3.0 volts; after resting the battery for one hour, it was charged at 0.5 mA/cm². This cycle was repeated as shown in FIG. 12 which shows that three cycles were completed over a seventy hour period. There is no decrease in the open circuit voltage of the test sample batteries. Therefore, it can be seen that the cathode material of the present invention in combination with lithium ions produces a reversible electrochemical reaction and results in an excellent secondary battery with the required levels of performance.

Figure 13:
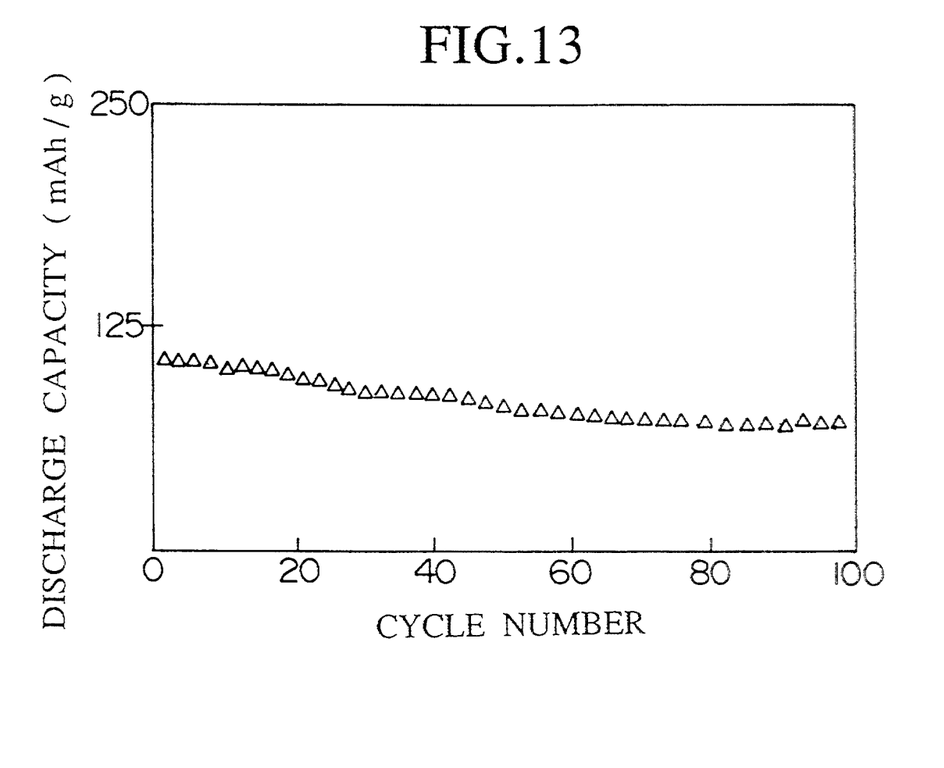
FIG. 13 is a graph showing the change in cycling capacity under repeated cycling of a test battery having the cathode material of the present invention.

Next, the test sample batteries were investigated for the degradation in cycling capacity by subjecting the test batteries to repeated charge and discharge cycles. The results are shown in terms of the variation in the cycling capacity in FIG. 13. These results indicate that, even after 100 cycles, there is no significant decrease in the cycling capacity. The results demonstrate that the cathode material of the present invention in combination with lithium ions provides a secondary battery of outstanding rechargeability, indicating that the electrochemical reaction involved in the charge and recharge processes is highly reversible.

Embodiment 8

Test battery samples were produced as described in embodiment 4, except for the use of a solvent solution which was an equal-volume mixture of ethylene carbonate with 2-methyltetrahydrofuran with an addition of LiAsF6 at a concentration of 1N. The battery samples used in embodiments 3 to 7 (propylene carbonate with 2-dimethoxy ethane with a solution of 1N LiClO4) showed no significant tendency to oxidize even when charged at 4.5 volts. However, the battery samples of this embodiment (made with ethylene carbonate and 2-methyl tetrahydrofuran) were decomposed by oxidation.

Figure 14:
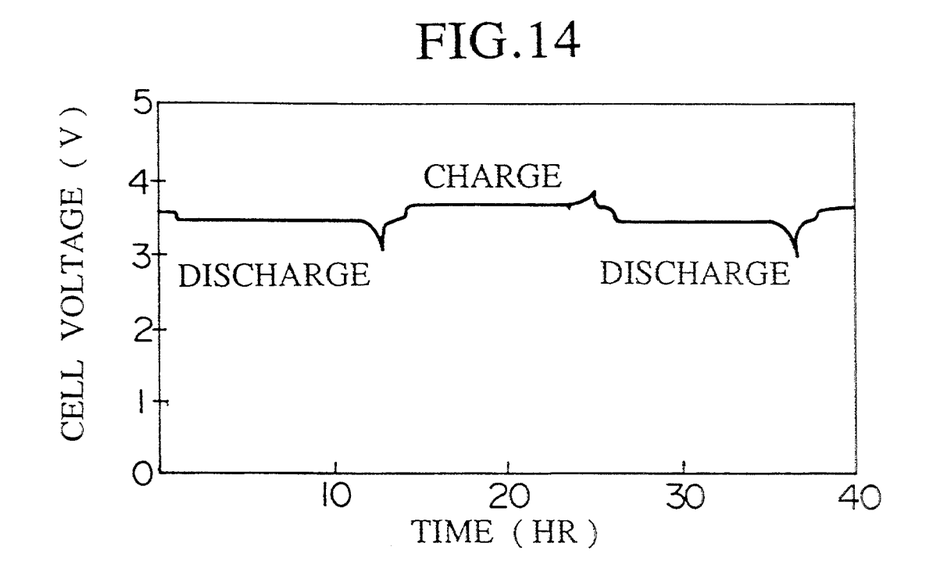
FIG. 14 is a graph showing the cyclability of a test battery having the cathode material of the present invention at the charge voltage of 3.9 volts.

The charge/discharge characteristics of the battery samples were measured in the same way as in embodiment 7, except for restricting the charge voltage range to between 3.9 and 3.0 volts. The results are shown in FIG. 14.

The results demonstrate that, using the cathode material of the present invention, even if the charge voltage is reduced to 3.9 volts, it is possible to retain good cycling capacity. Therefore, it becomes possible to make a secondary battery of the present invention using the existing electrolyte solvent offering a high cycling efficiency. However, the oxidation threshold voltage is relatively low.

Embodiment 9

Figure 15:
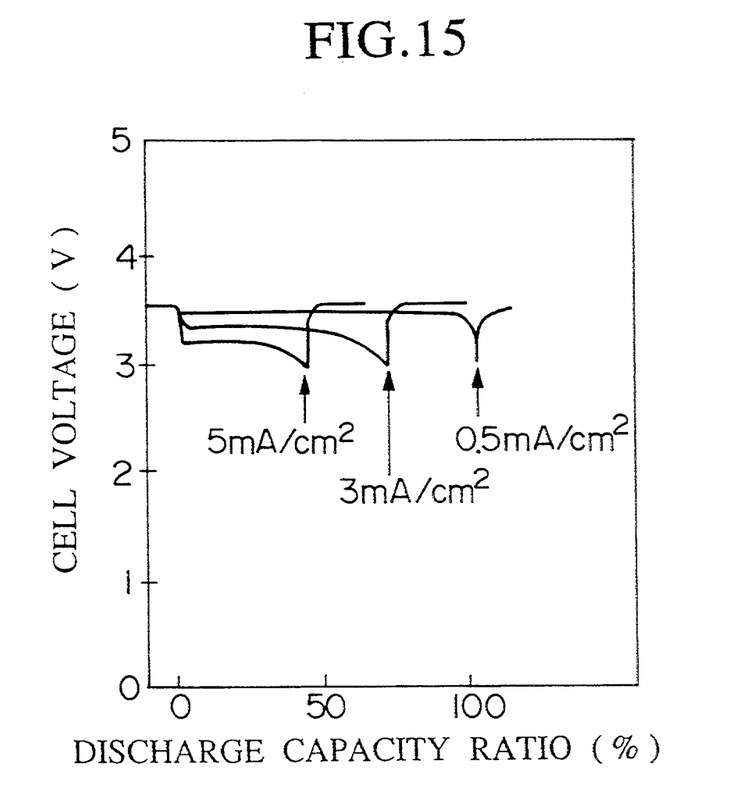
FIG. 15 is a graph showing the discharge characteristics of a test battery having the cathode material of the present invention subjected to different discharge currents.

An evaluation of the ability of the test samples to retain the discharge capacity at different loadings was carried out. The discharge current density was varied in three stages from 0.5 mA/cm², to 3 mA/cm² and to 5 mA/cm². The horizontal axis in FIG. 15 is a relative scale, whose 100% point represents the time at which the voltage starts to decrease for the case of 0.5 mA/cm². The results show that the larger the discharge current density, the smaller the battery capacity. However, it should be recognized that even at 5 mA/cm², nearly 50% of the capacity is still retained. This suggests, therefore, that high voltage and high current capacity can be produced by making improvements, such as changing the battery size.

What is claimed is:

1. A secondary battery having a positive electrode comprising an anhydrous ferric sulfate having a hexagonal crystal symmetry, a negative electrode comprising an alkaline metal, and a non-aqueous electrolyte solution comprising a non-aqueous solvent and a salt of said alkaline metal dissolved in said non-aqueous solvent.

2. A secondary battery as claimed in claim 1, wherein said anhydrous ferric sulfate is obtained by heat treating an iron sulfate in a temperature range between 250° and 600° C.

3. A secondary battery as claimed in claim 2, wherein said anhydrous ferric sulfate is obtained by heating $(NH_4)_2Fe(SO_4)_2.6H_2O$, in a temperature range between 430° and 600 ° C.

4. A secondary battery as claimed in claim 2, wherein said anhydrous ferric sulfate is obtained by heating $(NH_4)Fe(SO_4)_2.12H_2O$, in a temperature range between 430° and 600° C.

5. A secondary battery as claimed in claim 2, wherein said anhydrous ferric sulfate is obtained by heating $Fe_2(SO_4)_3.nH_2O$ in a temperature range between 250° and 600° C.

6. A secondary battery as claimed in claim 1, wherein said alkaline metal is lithium.

7. A secondary battery as claimed in claim 1, wherein said negative electrode is selected from the group consisting of lithium, a lithium alloy and a lithium compound.

8. A secondary battery as claimed in claim 7, wherein said lithium alloy is selected from the group consisting of a lithium aluminum alloy and a Wood's metal alloy, and said lithium compound is selected from the group consisting of lithium carbonate and lithium nitrate.

9. A secondary battery as claimed in claim 1, wherein said non-aqueous solvent medium is selected from the group consisting of ethylene carbonate, 2-ethyltetrahydrofuran diethoxysilane, 2-methyltetrahydrofuran, methyl formate, dimethyl sulfoxide, propylene carbonate, acetonytrile, $\gamma$-butylolactone, dimethulformamide, 1,2-dimethoxyethane, diethyl carbonate, dimethyl carbonate, methylethyl carbonate, tetrahydrofuran, 1,3-dioxolan, 4-methyl-1,3-dioxolan and a mixture thereof.

10. A secondary battery as claimed in claim 9, wherein said non-aqueous solvent medium is an equal volumetric mixture of ethylene carbonate and 2-methyltetrahydrofuran.

11. A secondary battery as claimed in claim 6, wherein said salt of said alkaline metal is selected from the group consisting of $LiAsF_6$, $LiBF_4$, $LiPF_6$, $LiAlCl_4$, $LiClO_4$, $LiC(CF_3SO_2)_3$, $LiC(CF_3SO_2)_2$, $LiCF_3SO_3$, $LiC_nF_{2n+1}SO_3$ where n is an integer greater than 1, $LiC_nF_{2n-1}SO_3$ where n is an integer greater than 1, $LiCl$, $LiSCN$, $LiSbF_6$, $LiCF_3CO_2$, $Li_2B_{10}Cl_{10}$, lithium tetraphenylborate, and lithium tetrakis- (3,5-bis-(trifluoromethyl)phenyl) borate.

* * * * *